US009186971B1

(12) United States Patent
Lee

(10) Patent No.: US 9,186,971 B1
(45) Date of Patent: Nov. 17, 2015

(54) STRUCTURE FOR SUPPORTING SUN ROOF DEFLECTOR

(71) Applicant: Hyundai Motor Company, Seoul (KR)

(72) Inventor: Ho-Ryul Lee, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/565,242

(22) Filed: Dec. 9, 2014

(30) Foreign Application Priority Data

Sep. 15, 2014 (KR) .......................... 10-2014-122143

(51) Int. Cl.
*B60J 7/22* (2006.01)
(52) U.S. Cl.
CPC ......................................... *B60J 7/22* (2013.01)
(58) Field of Classification Search
CPC .......................................................... B60J 7/22
USPC ........................................................ 296/217
See application file for complete search history.

(56) References Cited

U.S. PATENT DOCUMENTS

2007/0236052 A1\* 10/2007 Biewer et al. ................. 296/217
2015/0076870 A1\* 3/2015 Pfertner et al. ............... 296/217

FOREIGN PATENT DOCUMENTS

JP        2007-1411 A    1/2007
JP        2008-279864 A  11/2008

\* cited by examiner

*Primary Examiner* — Dennis H Pedder
(74) *Attorney, Agent, or Firm* — Morgan, Lewis & Bockius LLP

(57) ABSTRACT

A structure for supporting a sunroof deflector may include a deflector arm of which one end may be pivotably coupled to a deflector base on a roof of a vehicle and another end thereof may be connected with a deflector fabric, a deflector spring that may be disposed between the deflector base and the deflector arm and provides elastic force to the deflector arm, and a locking lever that may be pivotably fastened to the deflector arm by a hinge pin and has a locking lever with a hook at a front end thereof, wherein when a sunroof glass of the vehicle may be open, the hook of the locking lever may be locked to an end of the deflector spring and the deflector arm may be prevented from moving down accordingly.

8 Claims, 7 Drawing Sheets

STRUCTURE FOR SUPPORTING SUN ROOF DEFLECTOR

CROSS-REFERENCE TO RELATED APPLICATIONS

The present application claims priority to Korean Patent Application No. 10-2014-122143, filed on Sep. 15, 2014, the entire contents of which is incorporated herein for all purposes by this reference.

BACKGROUND OF THE INVENTION

1. Field of the Invention

The present invention relates to a structure for supporting a sunroof deflector on the roof of a vehicle, and more particularly, a structure for supporting a sunroof deflector which prevents a deflector arm from moving down, using a locking lever that is pivotably fastened to the deflector arm by a hinge pin and is locked to an end of a deflector spring when a sunroof glass of a vehicle is open.

2. Description of Related Art

An opening that can be opened/closed by a sunroof glass may be formed at the roof panel of a vehicle to discharge the air in the vehicle to the outside or let the external air flow inside the vehicle.

In particular, most sunroof panels of vehicles are recently made of glass for wide open feeling and an excellent esthetic design and panorama sunroofs selectively and partially opening/closing those sunroof panels are used.

Passengers can take the sunlight through the panorama sunroofs when a vehicle is running or stops, and they can also feel refreshed by opening the panorama sunroofs while a vehicle runs.

In general, a sunroof deflector that changes the direction of wind upward to prevent the wind from flowing into a vehicle through an opening, when the vehicle runs with a sunroof glass open, is disposed ahead of the panorama sunroofs.

Such a sunroof deflector is operated in a type of tilting up a deflector arm, using a specific electric device or a type of removing pressure on a deflector arm when a sunroof glass opens and of tilting up the deflector arm, using elastic force of a deflector spring.

FIG. 1 is a cross-sectional view illustrating a typical automobile sunroof deflector.

As illustrated in FIG. 1, the sunroof deflector of the related art includes a deflector arm 2 of which one end pivotably coupled to a deflector base 1 on the roof of a vehicle and the other end connected with a deflector fabric 3 and a deflector spring 4 that is disposed between the deflector base 1 and the deflector arm 2 and provides elastic force to the deflector arm 2.

When a sunroof of a vehicle opens, the deflector arm 2 is moved up by the elastic force of the deflector spring 4 and the deflector fabric 3 connected to the deflector arm 2 blocks the front of an opening 5, thereby preventing wind from flowing into the vehicle.

When a sunroof of a vehicle closes, the deflector arm 2 is pressed down by a command shoe coupled to a sunroof glass, and accordingly, the deflector fabric 3 connected to the deflector arm 2 is stowed.

However, as illustrated in the figure, according to the sunroof deflector of the related art, when a vehicle runs at a high speed, excessive air resistance is applied to the deflector fabric 3, so the deflector arm 2 moves down and causes wind noise.

Although it is possible to reduce downward movement of the deflector arm by increasing the stiffness of the deflector spring 4 to remove this problem, an increase of stiffness of the deflector spring reduces durability and lifespan of the deflector spring and causes mis-reversing (reversing of a sunroof glass due to misjudgment on sticking of an object) due to an increase of resistance when a sunroof glass closes.

It may be possible to increase a motor safety value (a reference value for reversing a sunroof glass, when the sunroof glass closes with an object stuck) to solve the problem of mis-reversing, but it also deteriorates sensitivity of the safety function.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure for supporting a sunroof deflector of which the ability of preventing wind noise is improved by preventing a deflector arm from moving down due to air resistance when a sunroof glass is open.

The present invention has also been made in an effort to provide a structure for supporting a sunroof deflector which can increase durability of a deflector spring, reduce the possibility of mis-reversing of a sunroof glass, and improve sensitivity of a safety function by minimizing the stiffness of a deflector spring.

The technical subject to implement in an exemplary embodiment of the present invention are not limited to the technical problems described above and other technical subjects that are not stated herein will be clearly understood by those skilled in the art from the following specifications.

In an aspect of the present invention, a structure for supporting a sunroof deflector, may include a deflector arm of which one end is pivotably coupled to a deflector base on a roof of a vehicle and another end thereof is connected with a deflector fabric, a deflector spring that is disposed between the deflector base and the deflector arm and provides elastic force to the deflector arm, and a locking lever that is pivotably fastened to the deflector arm by a hinge pin and may have a locking lever with a hook at a front end thereof, wherein when a sunroof glass of the vehicle is open, the hook of the locking lever is locked to an end of the deflector spring and the deflector arm is prevented from moving down accordingly.

The structure may further may include a hinge spring of which one end is coupled to the deflector arm and another end thereof is coupled to the locking lever, wherein the hinge spring presses the locking lever toward the deflector spring.

The locking lever may have a curved portion that is curved upward away from a hinge hole through which the hinge pin is disposed, and the curved portion of the locking lever is pressed by a command shoe coupled to the sunroof glass and the locking lever and the deflector spring are unlocked, when the sunroof glass closes.

The deflector spring may have an insert that is inserted inside a plurality of coupling protrusions formed on the deflector base, a center portion extending from the insert and curved upward, and a locking portion horizontally extending from the center portion and locked to the hook of the locking lever.

In another aspect of the present invention, a structure for supporting a sunroof deflector may include a deflector arm of which one end is pivotably coupled to a deflector base on a roof of a vehicle and another end thereof is connected with a deflector fabric, a deflector spring that is disposed between the deflector base and the deflector arm and provides elastic force to the deflector arm, a locking lever that is pivotably fastened to the deflector arm by a hinge pin and may have a locking lever with a hook at a front end thereof, and a support lever of which one end is pivotably coupled to the deflector base and another end thereof is locked to the hook of the locking lever, wherein when a sunroof glass of the vehicle is open, the hook of the locking lever is locked to an end of the support lever and the deflector arm is prevented from moving down accordingly.

The support lever may have a slot that is longitudinally formed so that an end of the deflector spring slides therein, and as the end of the deflector spring slides in the slot, the support lever pivots toward the locking lever.

The structure may further may include a hinge spring of which one end is coupled to the deflector arm and another end thereof is coupled to the locking lever, wherein the hinge spring presses the locking lever toward the support lever.

The locking lever may have a curved portion that is curved upward away from a hinge hole through which the hinge pin is disposed, and the curved portion of the locking lever is pressed by a command shoe coupled to the sunroof glass and the locking lever and the support lever are unlocked, when the sunroof glass closes.

According to the prevent invention having this configuration, when a sunroof glass of a vehicle opens, the hook of the locking lever is locked to the front end of the deflector spring or the front end of the support lever, such that it is possible to prevent the deflector arm from moving down due to air resistance when a vehicle runs at a high speed, thereby improving the ability of preventing wind noise in a vehicle.

It is also possible to minimize the stiffness of a the deflector spring through the structure for preventing deflecting arm from moving down, and accordingly, it is possible to improve durability and lifespan of the deflector spring.

Since the stiffness of the deflector spring is minimized, when a sunroof glass closes, closing load decreases, such that the possibility of mis-reversing of the sunroof glass is considerably reduced and sensitivity of the safety function of the sunroof glass can be increased.

Since the prevent invention achieves the structure for supporting a deflector arm with a relatively simple structure composed of a hinge spring, a locking lever, and a support lever, it is possible to reduce wind noise without a large increase of the manufacturing cost and the number of working processes, thereby improving the commercial value of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
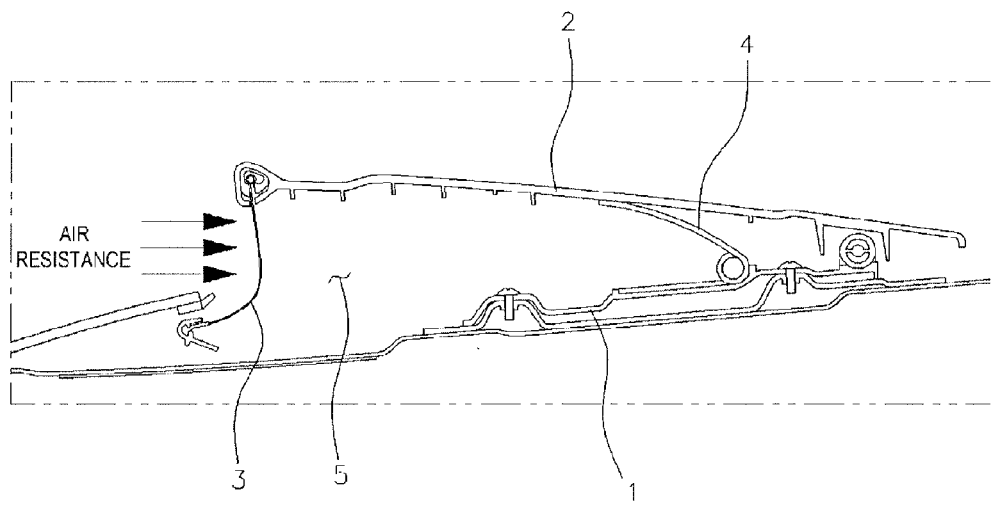
FIG. 1 is a cross-sectional view illustrating a typical automobile sunroof deflector.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiment of the present invention will be described in detail with reference to the accompanying drawings for those skilled in the art to be configured to easily accomplish the present invention. However, the present invention may be achieved in various different ways and is not limited to the exemplary embodiments described herein.

In the accompanying drawings, portions not related to the description will be omitted to clearly describe the present invention, and like reference numerals will be used to describe like components throughout the specification.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Figure 2:
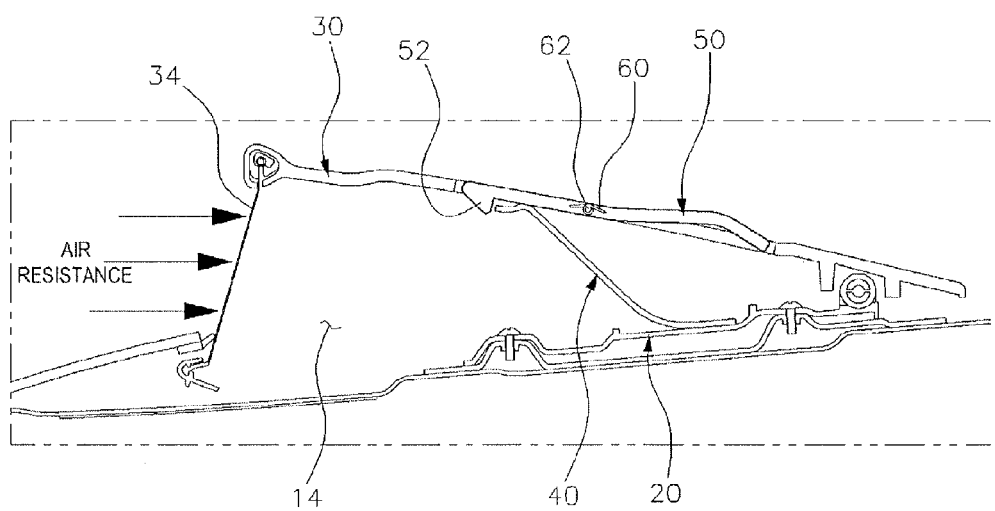
FIG. 2 is a cross-sectional view illustrating a structure for supporting a sunroof deflector according to an exemplary embodiment of the present invention.
Figure 3:
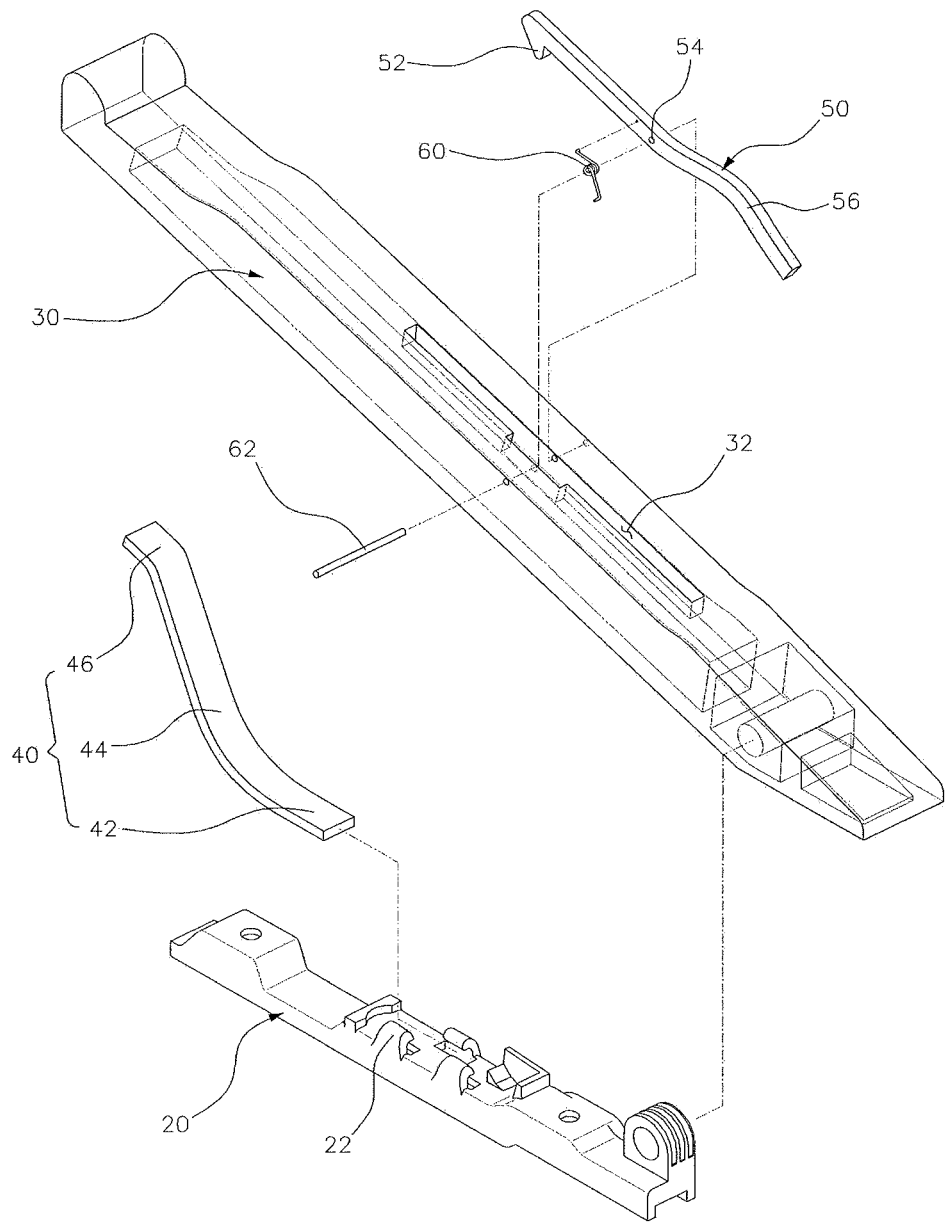
FIG. 3 is an exploded view illustrating disassembled parts of the structure for supporting a sunroof deflector according to an exemplary embodiment of the present invention.
Figure 4:
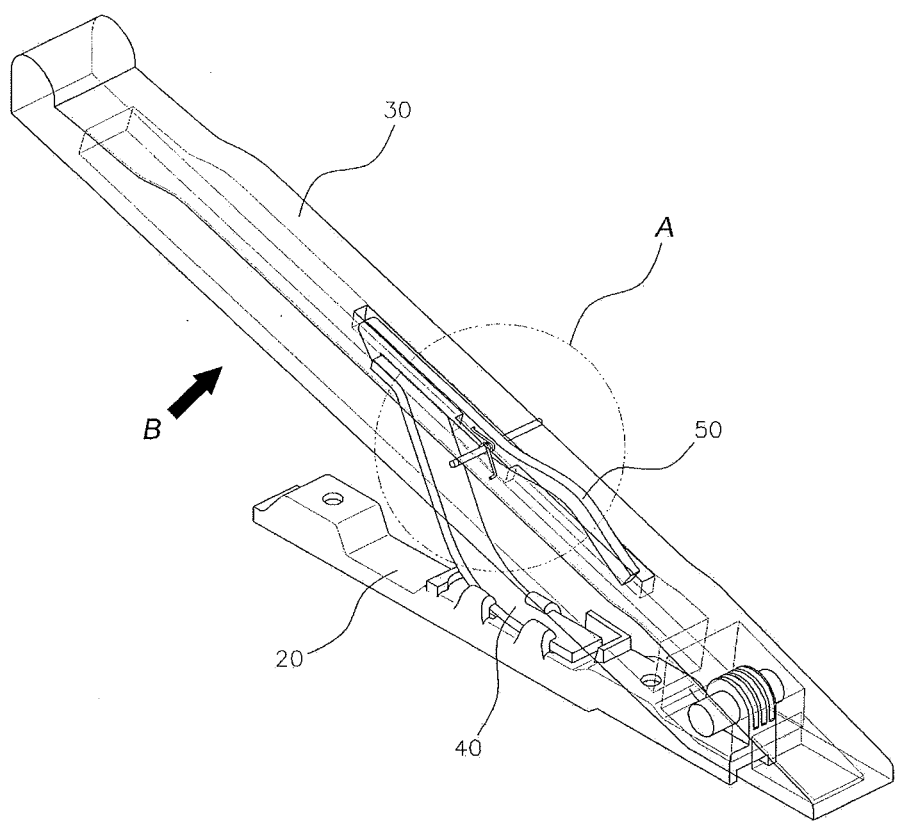
FIG. 4 is a perspective projection view illustrating the assembled structure for supporting a sunroof deflector according to an exemplary embodiment of the present invention.
Figure 5A:
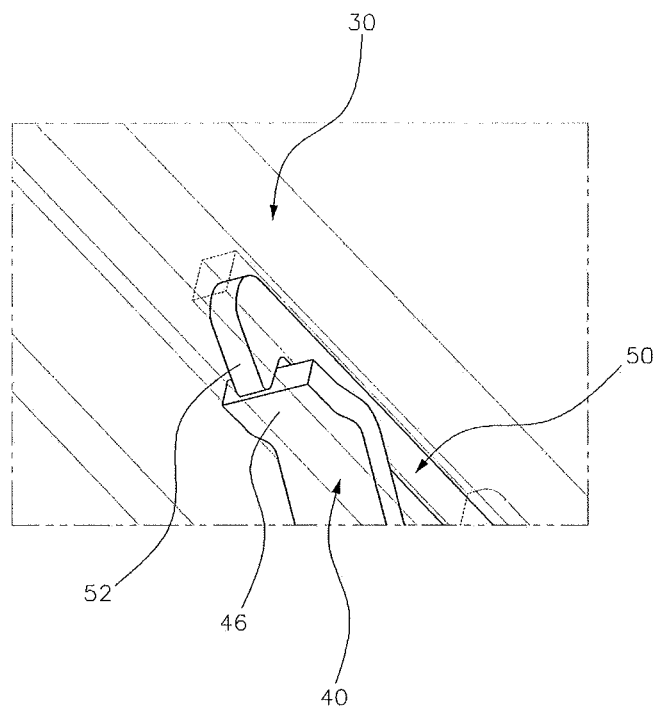
FIG. 5A is an enlarged view illustrating the portion A of the structure for supporting a sunroof deflector illustrated in FIG. 4.
Figure 5B:
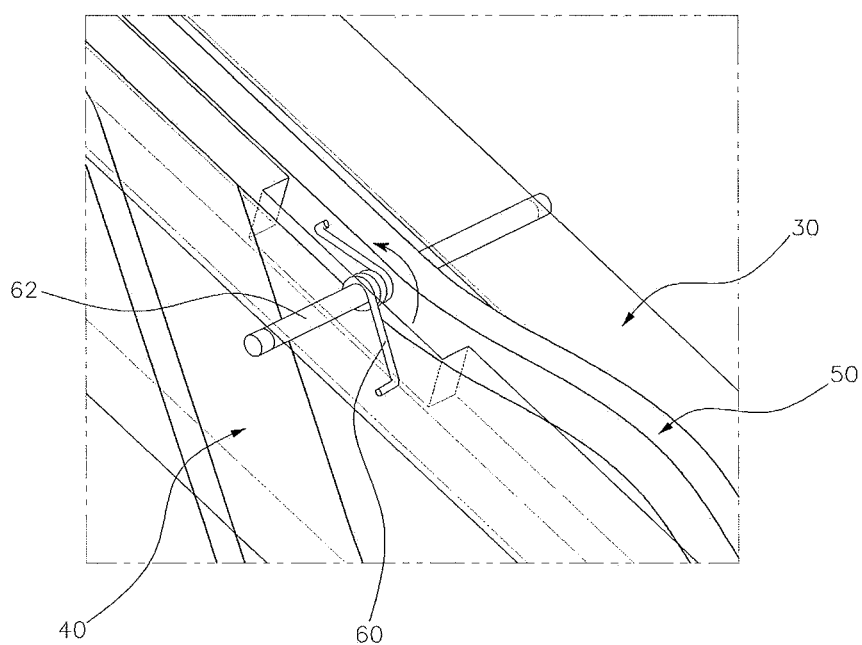
FIG. 5B is an enlarged view illustrating the structure for supporting a sunroof deflector illustrated in FIG. 4 in the direction B.

FIG. 2 is a cross-sectional view illustrating a structure for supporting a sunroof deflector according to an exemplary embodiment of the present invention, FIG. 3 is an exploded view illustrating disassembled parts of the structure for supporting a sunroof deflector according to an exemplary embodiment of the present invention, FIG. 4 is a perspective projection view illustrating the assembled structure for supporting a sunroof deflector according to an exemplary embodiment of the present invention, FIG. 5A is an enlarged view illustrating the portion A of the structure for supporting a sunroof deflector illustrated in FIG. 4, and FIG. 5B is an enlarged view illustrating the structure for supporting a sunroof deflector illustrated in FIG. 4 in the direction B.

As illustrated in FIGS. 2 to 5B, a structure for supporting a sunroof deflector according to an exemplary embodiment of the present invention includes: a deflector arm 30 of which one end is pivotably coupled to a deflector base 20 on a roof of a vehicle and the other end is connected with a deflector fabric 34; a deflector spring 40 that is disposed between the deflector base 20 and the deflector arm 30 and provides elastic force to the deflector arm 30; and. a locking lever 50 that is pivotably fastened to the deflector arm 30 by a hinge pin 62 and has a locking lever 50 with a hook 52 at the front end.

As in the exemplary embodiment illustrated in the figures, an opening 14 that can be opened/closed by a sunroof glass (10 in FIG. 6) moving forward/backward is formed at the roof of a vehicle, so it ventilates the inside of the vehicle and provides passengers with open feeling.

The sunroof glass 10 can open/close the opening 14 in various ways, for example, a way of sliding forward/backward on the vehicle by a driving device such as a motor or a way of tilting up/down on the vehicle, but the way of sliding forward/backward on a vehicle is exemplified in the description of the structure for supporting a sunroof deflector according to an exemplary embodiment of the present invention.

Such a sunroof glass 10 is usually made of a material that can effectively block ultraviolet rays and infrared rays, in detail, transparent glass, opaque glass, or synthetic resin.

As illustrated in FIG. 2, the deflector base 20 is disposed in the front-rear direction of the vehicle, at both sides of the opening 14 formed at the roof of the vehicle, and the deflector arm 30 and the deflector spring 40 are combined with the deflector base 20.

The deflector arm 30 has one end (the right end in the exemplary embodiment illustrated in the figures) hinged to the base 20 to pivot up/down and the other end (the left end in the exemplary embodiment illustrated in the figures) connected with the deflector fabric 34.

The deflector arm 30 pivots up/down in the way of tilting up/down by means of a specific electric device connected with it or the way of tilting up/down by elastic force of the deflector spring with opening of sunroof glass, but the way using the deflector spring 40 is exemplified in the description of the structure for supporting a sunroof deflector according to an exemplary embodiment of the present invention.

As the deflector spring 40, a torsion spring that has one leg fixed and the opposite leg generating load by turning is used, but a leaf spring having a specific shape, as will be described below, is used in the structure for supporting a sunroof deflector according to an exemplary embodiment of the present invention.

As illustrated in FIG. 3, a space 32 having a predetermined longitudinal size is formed in the deflector arm 30 and the locking lever 50 is positioned pivotably up/down in the space 32 by the hinge pin 62.

A hook 52 extending downward is formed at the front end of the locking lever 50 and is locked to the front end of the deflector spring 40 when the sunroof glass opens, as illustrated in FIG. 5A.

As illustrated in FIG. 3, the deflector spring 40 is formed in an S-shape, having an insert 42 that is inserted inside a plurality of coupling protrusions 22 formed on the deflector base 20, a center portion 44 extending from the insert 42 and curved upward, and a locking portion 46 horizontally extending from the center portion 44 and locked to the hook 52 of the locking lever 50.

The deflector spring 40 is shaped to more efficiently implement the structure for supporting a sunroof deflector according to an exemplary embodiment of the present invention and this shape of the deflector spring 40 enables the deflector arm 30 to be more strongly supported.

A hinge spring 60 formed in the shape of a torsion spring is further disposed in the space 32 of the deflector arm 30 and can provide elastic force to the locking lever 50. The hinge spring 60 has one end coupled to the deflector arm 30 and the other end coupled to the locking lever 50, with the center through the hinge pin 62.

As illustrated in FIG. 5B, the hinge spring 60 keeps pressing the locking lever 50 toward the deflector spring 40 (counterclockwise in the exemplary embodiment illustrated in the figures), such that hook 52 of the locking lever 50 maintains a tendency to keep locked to the deflector spring 40.

As illustrated in FIG. 3, the locking lever 50 has a curved portion 56 curved upward away from the hinge hole 54, so the curved portion 56 is pressed by a command shoe (12 in FIGS. 6A-6D) coupled to the sunroof glass and the locking lever 50 and the deflector spring 40 are unlocked, when the sunroof glass closes.

The operation process of the structure for supporting a sunroof deflector according to an exemplary embodiment of the present invention is as follows.

FIGS. 6A-6D are cross-sectional views illustrating the operation process of the structure for supporting a sunroof deflector according to an exemplary embodiment of the present invention.

Figure 6A:
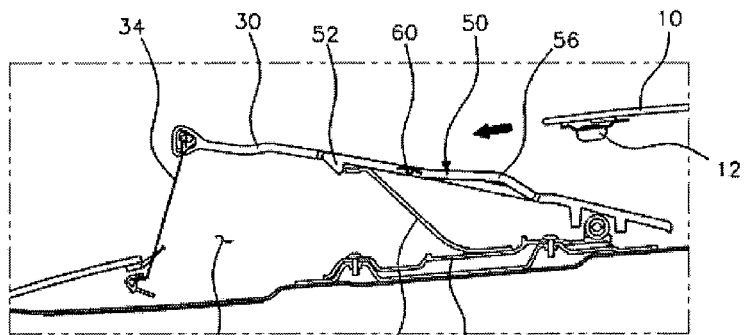
FIG. 6A, FIG. 6B, FIG. 6C, and FIG. 6D are cross-sectional views illustrating the operation process of the structure for supporting a sunroof deflector according to an exemplary embodiment of the present invention.

As illustrated in FIG. 6A, with the sunroof glass 10 of a vehicle open, the hook 52 of the locking lever 50 is locked to the deflector spring 40 and the deflector arm 30 is supported by the deflector spring 40.

Figure 6B:
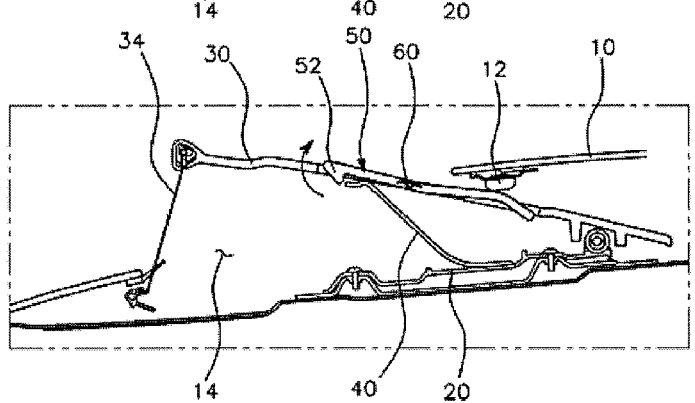

As illustrated in FIG. 6B, as the sunroof glass 10 gradually moves forward, the command shoe 12 coupled to the sunroof glass 10 presses the curved portion 56 of the locking lever 50, and accordingly, the locking lever 50 turns clockwise and the hook 52 of the locking lever 50 and the deflector spring 40 are unlocked.

Figure 6C:
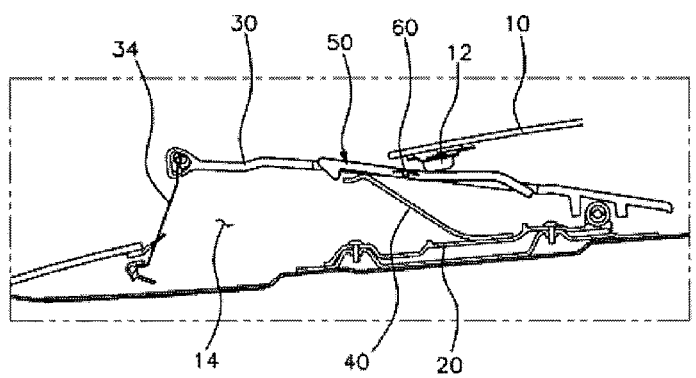

As illustrated in FIG. 6C, as the sunroof glass 10 further moves forward with the locking lever 50 and the deflector spring unlocked, the command shoe 12 presses the deflector arm 30 and the deflector arm 30 gradually moves down accordingly.

Figure 6D:
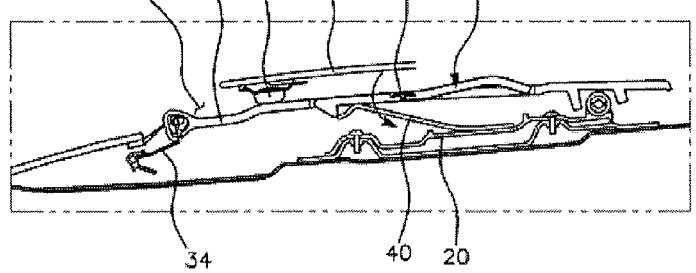

As illustrated in FIG. 6D, when the sunroof glass 10 moves forward to almost close the opening 14 of the vehicle, the deflector arm fully moves down, the deflector fabric 34 is stowed, and the locking lever 50 pivots counterclockwise to the initial position by the hinge spring 60.

Figure 7:
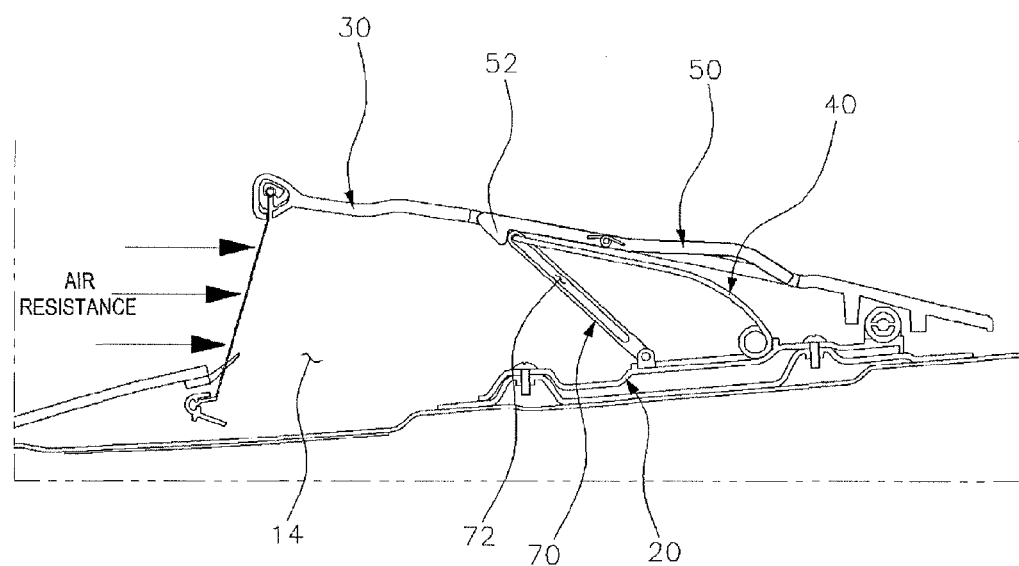
FIG. 7 is a cross-sectional view illustrating a structure for supporting a sunroof deflector according to another embodiment of the present invention.

FIG. 7 is a cross-sectional view illustrating a structure for supporting a sunroof deflector according to another embodiment of the present invention.

As illustrated in FIG. 7, a structure for supporting a sunroof deflector according to an exemplary embodiment of the present invention includes: a deflector arm 30 of which one end is pivotably coupled to a deflector base 20 on a roof of a vehicle and the other end is connected with a deflector fabric 34; a deflector spring 40 that is disposed between the deflector base 20 and the deflector arm 30 and provides elastic force to the deflector arm 30; a locking lever 50 that is pivotably fastened to the deflector arm 30 by a hinge pin 62 and has a locking lever 50 with a hook 52 at the front end; and. a support lever 70 of which one end is pivotably coupled to the deflector base 20 and the other end is locked to the hook 52 of the locking lever 50.

The deflector base 20, deflector arm 30, locking lever 50, and hinge spring 60 are similar to or the same as those used in the structure for supporting a sunroof deflector according to the previous embodiment of the present invention.

However, the deflector spring 40 may be the same as that used in the structure for supporting a sunroof deflector according to the previous embodiment of the present invention, but a kind of torsion spring is exemplified in the exemplary embodiment illustrated in FIG. 7 to slide better in a slot 72 of the support lever 70.

As illustrated in FIG. 7, the support lever 70 is a rod of which one end (the right end in the exemplary embodiment illustrated in the figure) is pivotably coupled and the other end (the left end in the exemplary embodiment illustrated in the figure) can be selectively locked to the hook 52 of the locking lever 50.

The support lever 70 assists the deflector arm 30 to be more strongly supported, by complementing the configuration of simply supporting the deflector arm with the deflector spring 40 in the previous embodiment of the present invention.

The slot 72 is formed in the support lever 70 so that an end of the deflector spring 40 can slide longitudinally therein, and as the deflector spring 40 slides, the support lever 70 pivots toward the locking lever 50 (clockwise in the exemplary embodiment illustrated in the figure).

The operation process of the structure for supporting a sunroof deflector according to the present exemplary embodiment of the present invention is as follows.

FIGS. 8A-8D are cross-sectional views illustrating the operation process of the structure for supporting a sunroof deflector according to the present exemplary embodiment of the present invention.

Figure 8A:
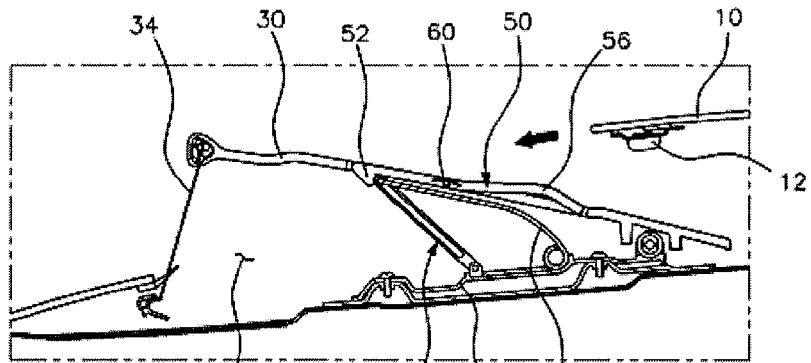
FIG. 8A, FIG. 8B, FIG. 8C, and FIG. 8D are cross-sectional views illustrating the operation process of the structure for supporting a sunroof deflector according to another embodiment of the present invention.

As illustrated in FIG. 8A, with the sunroof glass 10 of a vehicle open, the hook 52 of the locking lever 50 is locked to the support lever 70 and the deflector arm 30 is supported by the support lever 70.

Figure 8B:
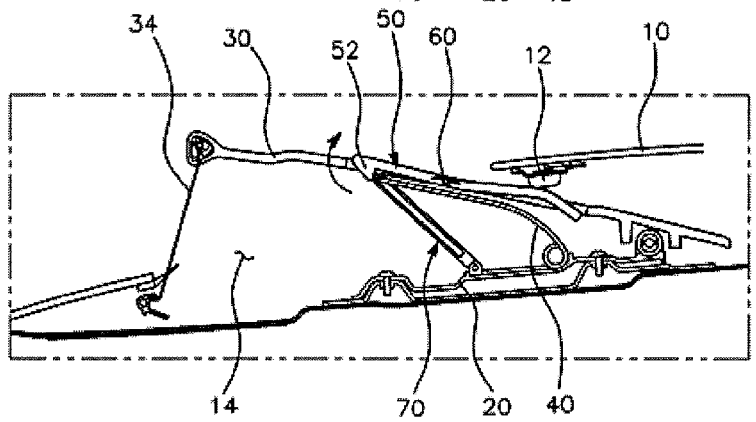

As illustrated in FIG. 8B, as the sunroof glass 10 gradually moves forward, the command shoe 12 coupled to the sunroof glass 10 presses the curved portion 56 of the locking lever 50, and accordingly, the locking lever 50 turns clockwise and the hook 52 of the locking lever 50 and the support lever 70 are unlocked.

Figure 8C:
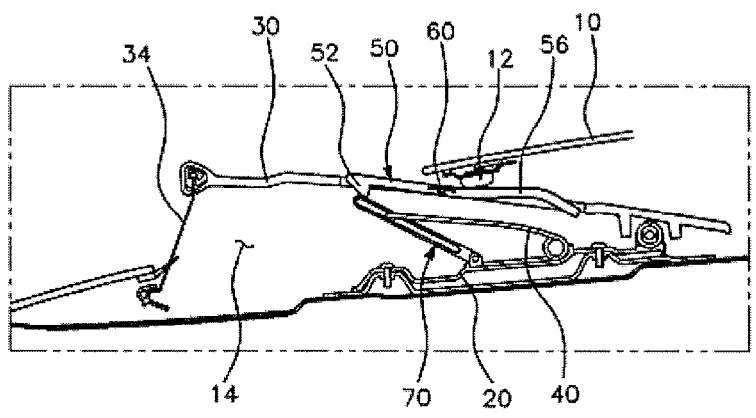

As illustrated in FIG. 8C, as the sunroof glass 10 further moves forward with the locking lever 50 and the support lever 70 unlocked, the command shoe 12 presses the deflector arm 30 and the deflector arm 30 gradually moves down accordingly.

Figure 8D:
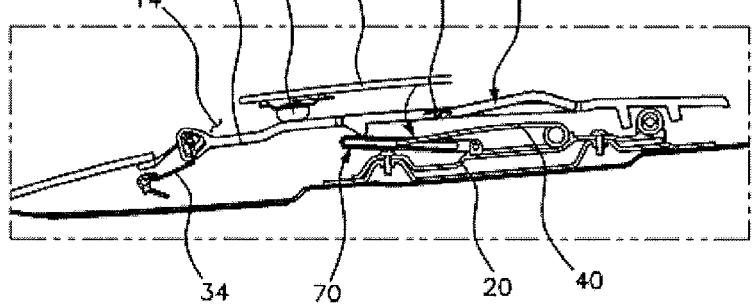

As illustrated in FIG. 8D, when the sunroof glass 10 moves forward to almost close the opening 14 of the vehicle, the deflector arm 30 fully moves down, the deflector fabric 34 is stowed, and the locking lever 50 pivots counterclockwise to the initial position by the hinge spring 60.

As described above, the structures for supporting a sunroof deflector according to the exemplary embodiments of the present invention has the advantage of considerably improving the ability of preventing wind noise in a vehicle by preventing the deflector arm 30 from moving down due to air resistance, when the vehicle runs at a high speed, using the configurations described above.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for supporting a sunroof deflector, comprising:
    a deflector arm of which one end is pivotably coupled to a deflector base on a roof of a vehicle and another end thereof is connected with a deflector fabric;
    a deflector spring that is disposed between the deflector base and the deflector arm and provides elastic force to the deflector arm; and
    a locking lever that is pivotably fastened to the deflector arm by a hinge pin and the locking lever with a hook at a front end thereof,
    wherein when a sunroof glass of the vehicle is open, the hook of the locking lever is locked to an end of the deflector spring and the deflector arm is prevented from moving down accordingly.

2. The structure of claim 1, further comprising:
    a hinge spring of which one end is coupled to the deflector arm and another end thereof is coupled to the locking lever,
    wherein the hinge spring presses the locking lever toward the deflector spring.

3. The structure of claim 1, wherein the locking lever has a curved portion that is curved upward away from a hinge hole through which the hinge pin is disposed, and
    the curved portion of the locking lever is pressed by a command shoe coupled to the sunroof glass and the locking lever and the deflector spring are unlocked, when the sunroof glass closes.

4. The structure of claim 1, wherein the deflector spring has:
    an insert that is inserted inside a plurality of coupling protrusions formed on the deflector base;
    a center portion extending from the insert and curved upward; and
    a locking portion horizontally extending from the center portion and locked to the hook of the locking lever.

5. A structure for supporting a sunroof deflector, comprising:
    a deflector arm of which one end is pivotably coupled to a deflector base on a roof of a vehicle and another end thereof is connected with a deflector fabric;
    a deflector spring that is disposed between the deflector base and the deflector arm and provides elastic force to the deflector arm;

a locking lever that is pivotably fastened to the deflector arm by a hinge pin and has a locking lever with a hook at a front end thereof; and a support lever of which one end is pivotably coupled to the deflector base and another end thereof is locked to the hook of the locking lever, wherein when a sunroof glass of the vehicle is open, the hook of the locking lever is locked to an end of the support lever and the deflector arm is prevented from moving down accordingly.

6. The structure of claim 5, wherein the support lever has a slot that is longitudinally formed so that an end of the deflector spring slides therein, and as the end of the deflector spring slides in the slot, the support lever pivots toward the locking lever.

7. The structure of claim 5, further comprising:

a hinge spring of which one end is coupled to the deflector arm and another end thereof is coupled to the locking lever, wherein the hinge spring presses the locking lever toward the support lever.

8. The structure of claim 5, wherein the locking lever has a curved portion that is curved upward away from a hinge hole through which the hinge pin is disposed, and the curved portion of the locking lever is pressed by a command shoe coupled to the sunroof glass and the locking lever and the support lever are unlocked, when the sunroof glass closes.

\* \* \* \* \*